(12) United States Patent
Ballantine et al.

(10) Patent No.: US 11,492,711 B2
(45) Date of Patent: Nov. 8, 2022

(54) ELECTROCHEMICAL DEVICES, MODULES, AND SYSTEMS FOR HYDROGEN GENERATION AND METHODS OF OPERATING THEREOF

(71) Applicant: OHMIUM INTERNATIONAL, Inc., Incline Village, NV (US)

(72) Inventors: Arne Ballantine, Incline Village, NV (US); Peter Light, San Francisco, CA (US); Albert Esser, Santa Cruz, CA (US); Chockkalingam Karuppaiah, Fremont, CA (US); Kirsten Burpee, San Jose, CA (US)

(73) Assignee: Ohmium International, Inc., Incline Village, NV (US)

( * ) Notice: Subject to any disclaimer, the term of this patent is extended or adjusted under 35 U.S.C. 154(b) by 0 days.

(21) Appl. No.: 17/101,232

(22) Filed: Nov. 23, 2020

(65) Prior Publication Data
US 2021/0156038 A1 May 27, 2021

Related U.S. Application Data

(60) Provisional application No. 62/938,494, filed on Nov. 21, 2019.

(51) Int. Cl.
*C25B 9/19* (2021.01)
*C25B 15/02* (2021.01)
(Continued)

(52) U.S. Cl.
CPC .................. *C25B 9/19* (2021.01); *C25B 1/04* (2013.01); *C25B 1/50* (2021.01); *C25B 9/75* (2021.01);
(Continued)

(58) Field of Classification Search
CPC ................ C25B 9/19; C25B 1/04; C25B 9/77
See application file for complete search history.

(56) References Cited

U.S. PATENT DOCUMENTS

| 5,980,726 A | 11/1999 | Moulthrop, Jr. et al. |
| 2004/0045815 A1 | 3/2004 | Tseng et al. |
| (Continued) | | |

FOREIGN PATENT DOCUMENTS

| CN | 105036254 A | 11/2015 |
| CN | 206872952 U | 1/2018 |
| CN | 109338394 A | 2/2019 |

OTHER PUBLICATIONS

Ballantine, A. et al., "Systems and Methods of Ammonia Synthesis," U.S. Appl. No. 17/101,224, filed Nov. 23, 2020.
(Continued)

*Primary Examiner* — Nicholas A Smith
(74) *Attorney, Agent, or Firm* — Polsinelli PC

(57) ABSTRACT

A system for hydrogen generation includes at least one cabinet defining a first volume, a second volume, and a third volume, where the first volume, the second volume and the third volume are fluidically isolated from each other, a water circuit located in the first volume, an electrochemical module including an electrolyzer electrochemical stack located in the second volume, a hydrogen circuit located in the third volume, at least one first fluid connector fluidly connecting the water circuit and the electrolyzer electrochemical stack, and at least one second fluid connector fluidly connecting the electrolyzer electrochemical stack and the hydrogen circuit.

10 Claims, 5 Drawing Sheets

(51) Int. Cl.
    *C25B 15/08*     (2006.01)
    *C25B 1/04*     (2021.01)
    *C25B 15/023*     (2021.01)
    *C25B 1/50*     (2021.01)
    *C25B 9/75*     (2021.01)
    *C25B 9/77*     (2021.01)

(52) U.S. Cl.
    CPC ................ *C25B 9/77* (2021.01); *C25B 15/02* (2013.01); *C25B 15/023* (2021.01); *C25B 15/08* (2013.01)

(56) References Cited

U.S. PATENT DOCUMENTS

2016/0068976 A1*   3/2016   Yoshida .................... C25B 9/73
                                                  204/265
2020/0010961 A1*   1/2020   Kazuno .................... C25B 9/70

OTHER PUBLICATIONS

Ballantine, A. et al., "Modular Systems for Hydrogen Generation and Methods of Operating Thereof," U.S. Appl. No. 17/101,251, filed Nov. 23, 2020.

Chisholm, G. et al., "3D printed flow plates for the electrolysis of water: an economic and adaptable approach to device manufacture," Energy Environ. Sci., vol. 7, pp. 3026-3032, (2014) DOI: 10.1039/c4ee01426j.

Notification of Transmittal of the International Search Report and the Written Opinion of the International Searching Authority for International Patent Application No. PCT/US2020/061771, dated May 7, 2021, 11 pages.

* cited by examiner

ELECTROCHEMICAL DEVICES, MODULES, AND SYSTEMS FOR HYDROGEN GENERATION AND METHODS OF OPERATING THEREOF

CROSS-REFERENCE TO RELATED APPLICATIONS

This application claims the benefit of U.S. Provisional Patent Application No. 62/938,494, filed on Nov. 21, 2019, the entire contents of which are incorporated herein by reference.

FIELD

The present disclosure is directed to chemical production in general and, more specifically, to electrochemical modules and systems for hydrogen generation.

BACKGROUND

Hydrogen is a common gas that has many industrial uses, such as petroleum refining, metal treatment, food processing, and ammonia production. Although hydrogen is abundant and can be formed from a variety of renewable and non-renewable energy sources, the combustibility of hydrogen in air makes hydrogen difficult to store and ship. As a result, hydrogen is generally not amenable to large-scale production at a centralized facility for subsequent distribution across large geographical regions. Rather, hydrogen is generally used at or near the site of its production.

SUMMARY

According to one embodiment, a system for hydrogen generation includes at least one cabinet defining a first volume, a second volume, and a third volume, where the first volume, the second volume and the third volume are fluidically isolated from each other, a water circuit located in the first volume, an electrochemical module including an electrolyzer electrochemical stack located in the second volume, a hydrogen circuit located in the third volume, at least one first fluid connector fluidly connecting the water circuit and the electrolyzer electrochemical stack, and at least one second fluid connector fluidly connecting the electrolyzer electrochemical stack and the hydrogen circuit.

In one embodiment, the at least one cabinet comprises a single cabinet in which the first volume is isolated from the second volume by a first internal wall, and the second volume is isolated from the third volume by a second internal wall, the at least one first fluid connector extends through the first internal wall, and the at least one second fluid connector extends through the second internal wall.

In one embodiment, the system further comprises a first air mover fluidly connected to the first volume but not the second or the third volumes, and configured to ventilate the first volume without ventilating the second or the third volumes, a second air mover fluidly connected to the second volume but not the first or the third volumes, and configured to ventilate the second volume without ventilating the first or the third volumes, and a third air mover fluidly connected to the third volume but not the first or the second volumes, and configured to ventilate the third volume without ventilating the first or the second volumes.

In another embodiment, an electrochemical module for hydrogen processing includes a liquid-management section including a plurality of water connectors and at least one water manifold, and a gas-management section including an electrolyzer electrochemical stack and a hydrogen connector located above the liquid-management section and in fluid connection with the liquid-management section. The electrolyzer electrochemical stack includes at least one bipolar plate and a plurality of membrane electrode assemblies (MEAs), the at least one bipolar plate is in sealed engagement with one of the plurality of MEAs to define an anode channel therebetween, the at least one bipolar plate is in sealed engagement with another one of the plurality of MEAs to define a cathode channel therebetween, each of the plurality of water connectors is in fluid communication with the anode channel via the at least one manifold, and the hydrogen connector is in fluid communication with the cathode channel.

In another embodiment, a bipolar plate for an electrolyzer electrochemical stack comprises a substrate having an anode side and a cathode side opposite one another, the substrate defining a plurality of anode ports and a plurality of cathode ports each extending from the anode side to the cathode side of the substrate, the anode side defining an anode flow field oriented to direct water between at least some of the plurality of anode ports, and the cathode side defining a cathode flow field oriented to direct hydrogen gas toward the plurality of cathode ports, an anode gasket circumscribing the anode flow field and the plurality of anode ports along the anode side of the substrate, wherein the plurality of cathode ports are located outside the anode gasket, and a cathode gasket circumscribing the cathode flow field, the plurality of anode ports, and the plurality of cathode ports along the cathode side of the substrate.

In another embodiment, a hydrogen generation method includes electrolyzing water in an electrolyzer to generate a wet hydrogen stream, drying the wet hydrogen stream in a dryer to generate a dry hydrogen stream and a water and hydrogen containing stream, and providing the water and hydrogen containing stream to a hydrogen pump to pump hydrogen from the water and hydrogen containing stream into the dryer.

In one embodiment, the method also includes providing a water and oxygen containing stream from the electrolyzer to a separator, separating the water from the oxygen in the water and oxygen containing stream in the separator, and providing the separated water into the electrolyzer.

BRIEF DESCRIPTION OF THE FIGURES

Like reference symbols in the various drawings indicate like elements.

DETAILED DESCRIPTION

Figure 1A:
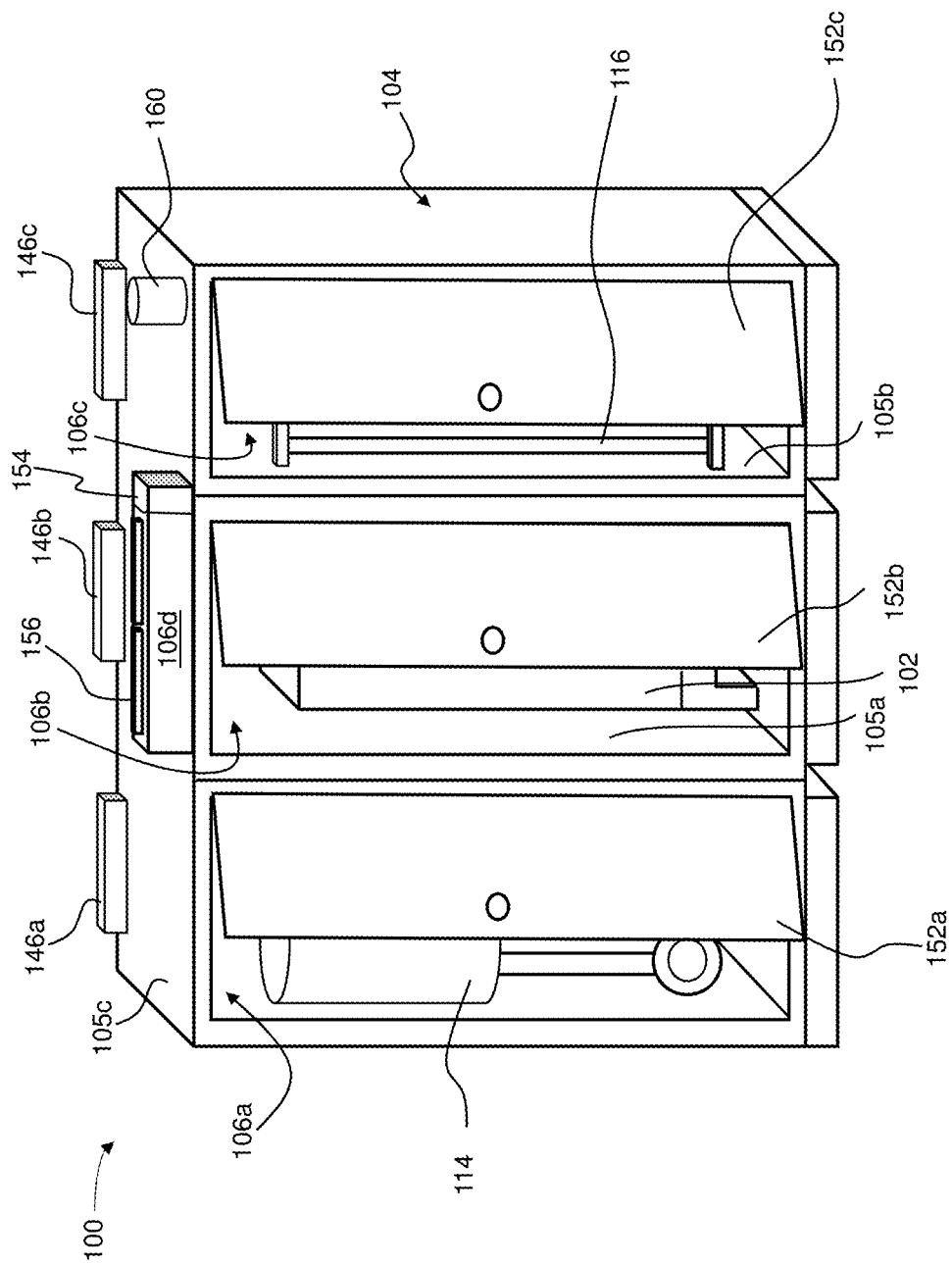
FIG. 1A is a perspective view of a system including a cabinet and an electrochemical module.

The embodiments will now be described more fully hereinafter with reference to the accompanying figures, in which exemplary embodiments are shown. The foregoing may, however, be embodied in many different forms and should not be construed as limited to the exemplary embodiments set forth herein. All fluid flows may flow through conduits (e.g., pipes and/or manifolds) unless specified otherwise.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

Co-locating hydrogen production with its ultimate industrial use can present challenges of its own related to plant footprint, safety, and resource availability. Accordingly, there remains a need for hydrogen generation that can be carried out cost-effectively in small footprint plants that are amenable to safe implementation in a wide range of locations, including resource-constrained areas. In the description that follows, various aspects of electrochemical devices, modules, and systems are described in the context of electrochemical electrolysis of hydrogen from water and electricity with separately ventilated cabinet sections (i.e., spaces) for electrolysis (i.e., electrolyzer stack location), oxygen processing and hydrogen processing. This configuration increases the system safety by separating oxygen and hydrogen processing equipment into separately ventilated spaces to reduce the likelihood of mixing and exothermic reaction between leaking oxygen and hydrogen.

Nevertheless, unless otherwise specified or made clear from the context, it shall be understood that any one or more of the various different devices, modules, or systems described herein may be additionally, or alternatively, used in any one or more of various different electrochemical processes in which a lower pressure reactant is an input to an electrochemical process that produces a higher pressure product. For example, unless a contrary intent is indicated, any one or more of the various different devices, modules, and systems described herein may be used to electrochemically pump hydrogen, as may be useful for recirculating hydrogen to increase the overall yield of a chemical process. As a more specific example, any one or more of the various different devices, modules, and systems described herein may be used to generate hydrogen and/or recirculate hydrogen for ammonia synthesis as part of any one or more of the various systems and methods described in U.S. patent application Ser. No. 17/101,224 filed on Nov. 23, 2020, entitled "SYSTEMS AND METHODS OF AMMONIA SYNTHESIS" by Ballantine et al., the entire contents of each of these references incorporated herein by reference.

Figure 1B:
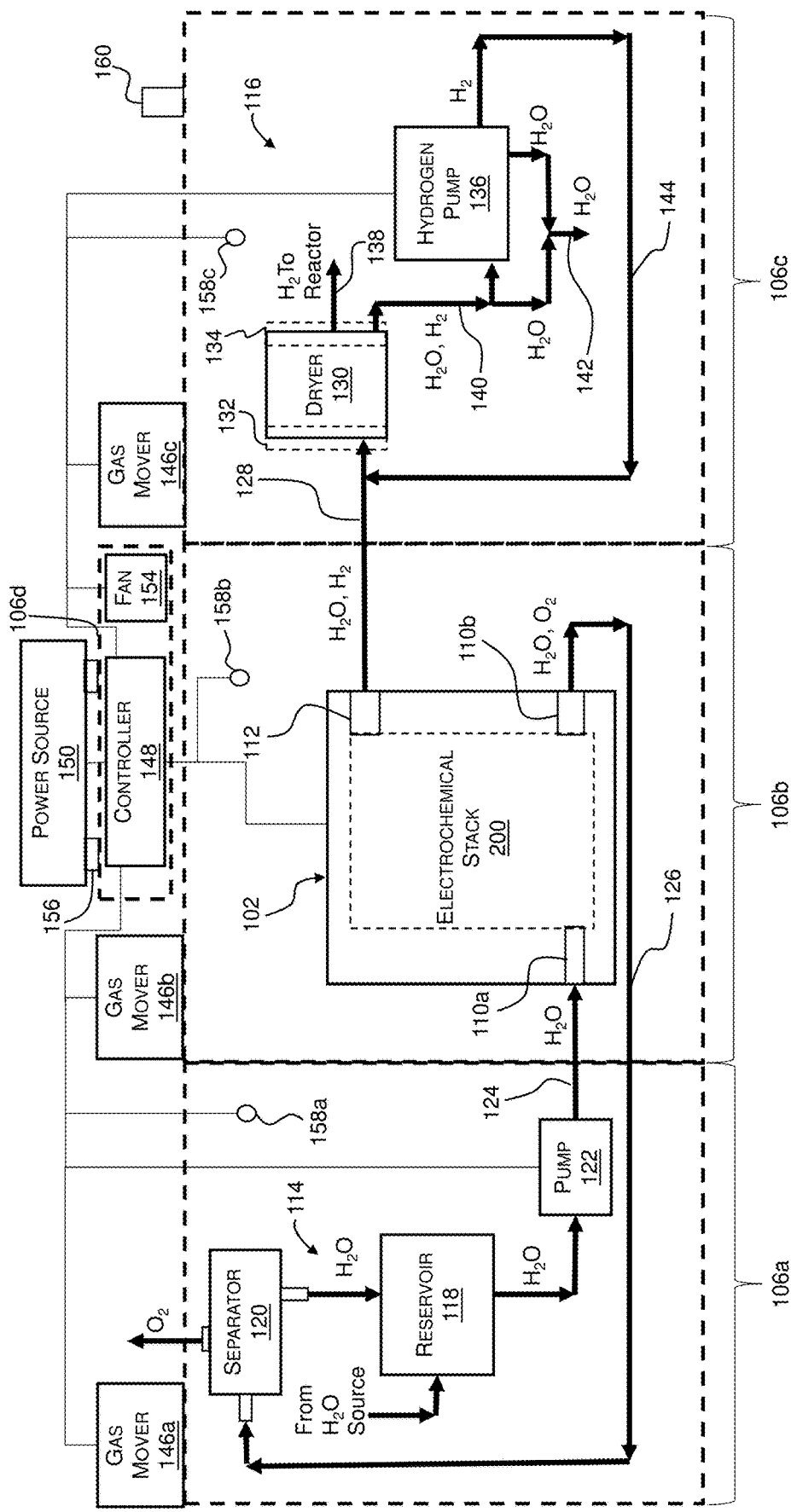
FIG. 1B is a block diagram of the system of FIG. 1A, representing connection of the electrochemical module to a water circuit and a hydrogen circuit in the cabinet.

Referring now to FIGS. 1A and 1B, a system 100 for generating hydrogen may include an electrochemical module 102 and at least one cabinet 104. The at least one cabinet 104 may define a first volume 106a, a second volume 106b, and a third volume 106c that are each isolated from one another, except for fluid connections between the electrochemical module 102 in the second volume 106b and equipment in the first volume 106a and the third volume 106c. While one cabinet (i.e., housing) 104 with three isolated volumes (106a, 106b, 106c) is shown in FIG. 1A, it should be noted that two or three separate cabinets 104 each containing one or two of the three isolated volumes may be used instead. If a single cabinet 104 is used, then the adjacent isolated volumes are isolated from each other by internal walls or partitions 105a, 105b of the cabinet 104. For example, a first internal wall 105a may separate the first volume 106a from the second volume 106b, and a second internal wall 105b may separate the second volume 106b from the third volume 106c. As used herein, two volumes are isolated from each other if a gas in one volume cannot pass into the other volume except through designated fluid conduits (e.g., pipes or manifolds) that connect the two volumes and are configured to provide a gas or a liquid between the two volumes. In one embodiment, each of the volumes 106a, 106b and 106c is separately ventilated by separate dedicated ventilation equipment, as will be described in more detail below.

The electrochemical module 102 may include an electrolyzer module, such as a proton exchange membrane (PEM) based electrolyzer module. The module 102 may include one or more electrochemical stacks 200, such as one or more PEM based electrolyzer stacks. The module 102 may also include a plurality of first fluid connectors 110a,b (referred to collectively as the plurality of first fluid connectors 110a,b and individually as the first fluid connector 110a and the first fluid connector 110b), and a second fluid connector 112. As described in greater detail below, the electrochemical module 102 may be disposed in the second volume 106b (e.g., between the first volume 106a and the third volume 106c) and connected in fluid communication with a water circuit 114 in the first volume 106a via the plurality of first fluid connectors 110a,b and in fluid communication with a hydrogen circuit 116 in the third volume 106c via the second fluid connector 112. Such partitioning of the electrochemical module 102, the water circuit (which includes oxygen processing equipment) 114, and the hydrogen circuit 116 into respective volumes 106b, 106a, 106c which are isolated from one another within the one or more cabinets 104 may facilitate safely generating commercial-scale quantities of hydrogen within a spatially compact footprint. This may be useful for, among other things, using the system 100 to generate hydrogen at installations with limited space and/or transporting the system 100 to remote installation sites. Additionally, or alternatively, as also described in greater detail below, the connectivity between the electrochemical module 102 and each of the water circuit 114 and the hydrogen circuit 116 within the cabinet 104 may include modularity that facilitates installation, maintenance, and repair.

In use, as described in greater detail below, water and electricity may be provided to the electrochemical stack 200, where some of the water may be electrochemically electrolyzed to form hydrogen (e.g., via hydrogen ion diffusion through a PEM electrolyte from an anode side of the electrolyzer cell to the cathode side of the PEM electrolyzer cell). For example, the water circuit 114 may be actuatable to deliver purified water from the first volume 106a of the cabinet 104 to the electrochemical stack 200 in the second volume 106b of the cabinet 104 via the first fluid coupling. As the purified water moves through the electrochemical stack 200, power delivered to the electrochemical stack 200 may move protons of at least some of the purified water through the PEM electrolyte to form hydrogen. Oxygen formed on the anode side of the cell by the electrolysis of the purified water, along with excess purified water, may be returned from the electrochemical stack 200 in the second volume 106b to the water circuit 114 in the first volume 106a. Additionally, or alternatively, the hydrogen formed by electrolysis in the electrochemical stack 200 may move from the cathode side of the electrochemical stack 200 in the second volume 106b of the cabinet 104 to the hydrogen circuit 116 in the third volume 106c of the cabinet 104. Accordingly, to the extent oxygen and hydrogen are present within the second volume 106b, the electrochemical stack 200 manages these streams separately and directs these streams to different portions (i.e., isolated volumes) of the cabinet 104 to reduce the likelihood of inadvertent mixing of oxygen and hydrogen to form a combustible mixture, as compared to a configuration in which oxygen and hydrogen are processed within the same, enclosed volume.

In general, the water circuit 114 may optionally include a reservoir (e.g., water tank) 118 in fluid communication between a separator 120 and a pump 122 via respective fluid conduits. In certain implementations, the reservoir 118 may be coupled to an external water source (e.g., water pipe, not shown) to receive a supply of water suitable for meeting the demands of the electrochemical stack 200. The connection between the reservoir 118 and the external water source may be made outside of the cabinet 104 to facilitate connection of the system 100 to an industrial water supply and, in some instances, to reduce the likelihood of damaging equipment in one or more of the first volume 106a, the second volume 106b, or the third volume 106c in the event of a leak in the connection between the external water source and the reservoir 118. It shall be appreciated that the water circuit 114 may include any of various different types of equipment useful for managing properties of the water flowing through the system 100. As an example, the water circuit 114 may include filtration or other processing equipment useful for purification of process water to reduce the concentration of contaminants that may degrade performance of other components (e.g., the electrochemical stack 200) over time. Additionally, or alternatively, the water circuit 114 may include a heat exchanger (not shown) in thermal communication with one or more of the reservoir 118, the separator 120, or the pump 122 to manage the temperature of each component and/or manage the temperature of water flowing through each component.

The pump 122 may be in fluid communication with the electrochemical stack 200 via a feed conduit 124 extending from the pump 122 in the first volume 106a to the first fluid connector 110a of the electrochemical module 102. The feed conduit 124 may extend through the wall 105a between the first volume 106a and the second volume 106b. In use, the pump 122 may be powered to move purified water from the reservoir 118, along the feed conduit 124 extending from the first volume 106a to the second volume 106b, and into the electrochemical stack 200 in the second volume 106b. Thus, the pump 122 may be operable to deliver purified water to the second volume 106b while being partitioned from equipment in each of the second volume 106b and the third volume 106c. Such partitioning of the pump 122 may be advantageous for, among other things, reducing the likelihood that heat generated by the pump 122 during operation may serve as an ignition source for a hydrogen-containing mixture. For example, in the event of a hydrogen leak in the second volume 106b and/or the third volume 106c, an ignitable hydrogen-air mixture may inadvertently form in the second volume 106b and/or the third volume 106c. Continuing with this example, keeping the pump 122 partitioned away from the second volume 106b and the third volume 106c may, therefore, reduce the likelihood that ignition can occur before the ignitable hydrogen-air mixture can be detected and the system safely shut down.

In some implementations, the water circuit 114 may include a recirculation circuit 126 in fluid communication between the first fluid connector 110b and the separator 120. Through the fluid communication with the first fluid connector 110b, the recirculation circuit 126 may receive an exit flow consisting essentially of water and oxygen from the anode portion of the electrochemical stack 200. At least a portion of the recirculation circuit 126 may extend from the second volume 106b to the first volume 106a through the wall 105b to direct the flow of water and oxygen from the electrochemical stack 200 in the second volume 106b to the separator 120 in the first volume 106a. By carrying oxygen to the separator 120 in the first volume 106a partitioned from the second volume 106b, the recirculation circuit 126 may reduce the likelihood that oxygen in the excess water flowing from the electrochemical module 102 may inadvertently escape into the second volume 106b and/or the third volume 106c to form an ignitable mixture with hydrogen.

The separator 120 may be any one or more of various different types of gas-liquid separators suitable for separating oxygen from excess water in the return flow moving through the recirculation circuit 126 from the electrochemical module 102. For example, the separator 120 may comprise a dryer, a condenser or another device which separates oxygen from excess water through gravity, with the excess water settling along a bottom portion of the separator 120 and oxygen collecting along a top portion of the separator 120. More generally, the separator 120 may operate to separate oxygen from excess water without the use of power or moving parts that could otherwise act as potential ignition sources in the system 100. The oxygen collected by the separator 120 may be directed out of the first volume 106a to be vented to an environment outside of the cabinet 104 or to be used as a process gas for another part of a plant. By way of example and not limitation, the oxygen collected by the separator 120 may be removed from the separator 120 using a suction pump or blower. The excess water collected by the separator 120 may be directed to the reservoir 118 to be circulated through the electrochemical stack 200 again. That is, more generally, the separator 120 may remove oxygen from the cabinet 104 at a position away from hydrogen-related equipment in the second volume 106b and the third volume 106c while facilitating efficient use of water in the formation of hydrogen.

In general, the hydrogen circuit 116 may collect a hydrogen-containing product stream formed by the electrochemical stack 200 in the second volume 106b and process this product stream using equipment partitioned from the first volume 106a and the second volume 106b. In this context, processing the product stream may include removing moisture from the product stream to produce substantially pure hydrogen. That is, removing moisture from hydrogen may reduce the potential for moisture to interfere with one or more downstream processes, with such interference potentially including degradation of downstream equipment. Further, or instead, given considerations associated with safety and energy-to-hydrogen efficiency of the system 100, processing the product stream in the hydrogen circuit 116 may require little or no energy while recovering all or substantially all (e.g., greater than about 99 percent) of the hydrogen produced by the electrochemical stack 200.

In some implementations, the hydrogen circuit 116 may include a product conduit 128 and a dryer 130 in fluid communication with one another. More specifically, the product conduit 128 may extend through the wall 105b between the second volume 106b and the third volume 106c. The product conduit 128 may be in fluid communication between inlet portion 132 of the dryer 130 and the second fluid connector 112 of the electrochemical module 102. Thus, in use, a product stream consisting essentially of hydrogen and water (e.g., water vapor) may move from the anode side of the electrochemical stack 200 to the inlet portion 132 of the dryer 130 via the second fluid connector 112 and the product conduit 128. As compared to the mixture of oxygen and excess water in the exit flow from the anode portion of the electrochemical stack 200 into the recirculation circuit 126, the product stream may be at a higher pressure. To reduce the likelihood of hydrogen leaking into the third volume 106c, the connections between the product conduit 128 and each of the second fluid connector 112 and the dryer 130 may include gas tight seals.

The dryer 130 may be, for example, pressure swing adsorption (PSA), a temperature swing adsorption (TSA) system or a hybrid PSA-TSA system. The dryer 130 may include one or more beds of a water-adsorbent material, such as activated carbon, silica, zeolite or alumina. As the product mixture consisting essentially of hydrogen and water moves through from the inlet portion 132 to an outlet portion 134 of the dryer 130, at least a portion of the water may be removed from the product mixture through adsorption of either water or hydrogen in the bed of water-adsorbent material. If hydrogen is adsorbed, then it is removed into the outlet conduit 138 during a pressure and/or temperature swing cycle. If water is adsorbed, then it is removed into a pump conduit 140 during the pressure and/or temperature swing cycle. In some instances, adsorption carried out by the dryer 130 may be passive, without the addition of heat or electricity that could otherwise act as ignition sources of an ignitable hydrogen-containing mixture. In such instances, however, considerations related to backpressure created by the dryer 130 in fluid communication with the electrochemical stack 200 may limit the size and, therefore, the single-pass effectiveness of the dryer 130 in removing moisture from the product stream.

At least in view of such considerations related to single-pass effectiveness of the dryer 130, the hydrogen circuit 116 may further, or instead, include a hydrogen pump 136 in fluid communication between the outlet portion 134 and the inlet portion 132 of the dryer 130 to recirculate the product mixture of hydrogen and water for additional passes through the dryer 130. For example, the dryer 130 may direct dried hydrogen from the outlet portion 134 of the dryer 130 to an outlet conduit 138 that directs the dried hydrogen to a downstream process or storage in an environment outside of the cabinet 104. Further, or instead, the dryer 130 may direct a portion of the product stream that has not adequately dried from the outlet portion 134 of the dryer 130 to a pump conduit 140 in fluid communication with the hydrogen pump 136. In certain instances, at least a portion of the water in the product mixture moving along the pump conduit 140 may condense out of the product mixture and collect in a moisture trap 142 in fluid communication with the pump conduit 140, before reaching the hydrogen pump 136. Such moisture condensed in the moisture trap 142 may be collected and/or directed to an environment outside of the cabinet 104.

The hydrogen pump 136 may be, for example, an electrochemical pump. As used in this context, an electrochemical pump shall be understood to include a proton exchange membrane (i.e., a PEM electrolyte) disposed between an anode and a cathode. The hydrogen pump 136 may generate protons moveable from the anode through the proton exchange membrane to the cathode form pressurized hydrogen. Thus, such an electrochemical pump may be particularly useful for recirculating hydrogen within the hydrogen circuit 116 at least because the electrochemical pumping provided by the electrochemical pump separates hydrogen from water in the mixture delivered to the hydrogen pump 136 via the pump conduit 140 while also pressurizing the separated hydrogen to facilitate moving the pressurized hydrogen to the inlet portion 132 of the dryer 130.

Alternatively, the hydrogen pump 136 may comprise another hydrogen pumping and/or separation device, such as a diaphragm compressor or blower or a metal-hydride separator (e.g., which selectively adsorbs hydrogen), which may be used in combination with or instead of the electrochemical hydrogen pump. In one embodiment, a plurality of stages of hydrogen pumping and/or re-pressurization may be used. Each stage may comprise one or more of the diaphragm compressor or blower, the electrochemical pump or the metal-hydride separator. In one implementation, the stages may be in a cascade (i.e., series) configuration and/or may be located in separate enclosures.

In certain implementations, the hydrogen pump 136 may be in fluid communication with the moisture trap 142, where the water separated from hydrogen in the hydrogen pump 136 may be collected and/or directed to an environment outside of the cabinet 104. Additionally, or alternatively, the pressurized hydrogen formed by the hydrogen pump 136 may be directed along a recovery circuit 144 in fluid communication between the hydrogen pump 136 and the inlet portion 132 of the dryer 130 (e.g., via mixing with the product stream in the product conduit 128) to recirculate the pressurized hydrogen to the dryer 130. Among other advantages, recirculating the pressurized hydrogen through the dryer 130 in this way facilitates moving hydrogen out of the cabinet 104 through only a single conduit (e.g., the outlet conduit 138), which may reduce potential failure modes as compared to the use of multiple exit points.

In some implementations, the separate ventilation and/or forced convection within each of the first volume 106a, the second volume 106b, and the third volume 106c may be useful for reducing the likelihood of forming an ignitable hydrogen-containing mixture in the respective volume. Further, or instead, forced convection may facilitate controlling temperature in the enclosed environments of the first volume 106a, the second volume 106b, and the third volume 106c. Such temperature control may be useful, for example, for reducing the likelihood that equipment in each respective volume may become an ignition source and/or may fail prematurely.

Accordingly, the system 100 may include a plurality of gas movers 146a,b,c (referred to collectively as the plurality of gas movers 146a,b,c and individually as the gas mover 146a, the gas mover 146b, and the gas mover 146c). The plurality of gas movers 146a,b,c may include any one or more of various different types of fans (e.g., purge fans), blowers, or compressors, unless otherwise specified or made clear from the context. In certain implementations, a powered circuit to each one of the plurality of gas movers 146a,b,c may be rated for Class 1 Division 2 operation, as specified according to the National Fire Protection Association (NFPA) 70®, National Electric Code® (NEC), Articles 500-503, 2020, the entire contents of which are incorporated herein by reference. In such implementations, each one of the plurality of gas movers 146a,b,c may be disposed within the cabinet 104. Alternatively, each one of the plurality of gas movers 146a,b,c may be mounted externally to the cabinet 104 (e.g., to the roof or sidewall of the cabinet) to reduce the potential for heat or sparks to act as an inadvertent ignition source for contents of the first volume 106a, the second volume 106b, or the third volume 106c.

In general, the gas mover 146a may be in fluid communication with the first volume 106a, the gas mover 146b may be in fluid communication with the second volume 106b, and the gas mover 146c may be in fluid communication with the third volume 106c. For example, each one of the plurality of gas movers 146a,b,c may be in fluid communication between an environment outside of the cabinet 104 and a corresponding one of the first volume 106a, the second volume 106b, and the third volume 106c, and may be configured to separately ventilate the respective volume of the cabinet 104. Additionally, or alternatively, each one of the plurality of gas movers 146a,b,c may be operable to form negative pressure in a corresponding one of the first volume 106a, the second volume 106b, and the third volume 106c, relative to the environment outside of the cabinet 104. Such negative pressure may be useful, for example, for drawing air from the environment into the first volume 106a, the second volume 106b, and the third volume 106c to reduce the likelihood that any hydrogen leaking into the first volume 106a, the second volume 106b, or the third volume 106c may accumulate in a concentration above the lower ignition limit of a hydrogen-air mixture at the temperature and pressure associated with the cabinet 104. Further, or instead, negative pressure in the first volume 106a, the second volume 106b, and the third volume 106c may reduce the likelihood that an ignitable, hydrogen containing mixture may escape from the cabinet 104. In certain instances, the cabinet 104 may be insulated to facilitate maintaining one or more components in the first volume 106a, the second volume 106b, and the third volume 106c within a temperature range (e.g., between about 60° C. and about 80° C.) suitable for operation of the electrochemical stack 200.

While the plurality of gas movers 146a,b,c may be useful for reducing the likelihood of unsafe conditions forming in the first volume 106a, the second volume 106b, or the third volume 106c, it shall be appreciated that one or more of these volumes may additionally, or alternatively, include area classified components. In such instances, the corresponding volume may be unventilated.

In certain implementations, the system 100 may include a controller 148 in electrical communication at least with one or more components in the first volume 106a, the second volume 106b, or the third volume 106c. In general, the controller 148 may include one or more processors and a non-transitory computer-readable storage medium having stored thereon instructions for causing the one or more processors to control one or more of startup, operation, or shutdown of any one or more of various aspects of the system 100 to facilitate safe and efficient operation. For example, the controller 148 may include one or more embedded controllers for one or more components in the first volume 106a, the second volume 106b, or the third volume 106c. Additionally, or alternatively, the controller 148 may be in electrical communication at least with the electrochemical stack 200 and a power source 150. Continuing with this example, the controller 148 may interrupt power to the electrochemical stack 200 in the event that an anomalous condition is detected. Further, or instead, the controller 148 may provide power to the electrochemical stack 200 after a startup protocol (e.g., purging the first volume 106a, the second volume 106b, and or the third volume 106c) to reduce the likelihood of igniting a hydrogen-containing mixture in the cabinet 104.

In some implementations, the cabinet 104 may define a fourth volume 106d, and the controller 148 may be disposed in the fourth volume 106d while being in wireless or wired communication with one or more of the various different components described herein as being disposed in one or more of the first volume 106a, the second volume 106b, or the third volume 106c. The fourth volume 106d may be generally located in the vicinity of the first volume 106a, the second volume 106b, and the third volume 106c to facilitate making and/or breaking electrical connections as part of one or more of installation, startup, regular operation, maintenance, or repair. Thus, for example, the fourth volume 106d may be disposed along a top portion of the cabinet 104 and/or along a back portion of the cabinet 104, with both locations providing useful access to each of the first volume 106a, the second volume 106b, and the third volume 106c while being away from the first door 152a, the second door 152b, and the third door 152c that may be used to provide access to the first volume 106a, the second volume 106b, and the third volume 106c, respectively. Further, or instead, with the controller 148 disposed therein, the fourth volume 106d may be fluidically isolated from each of the first volume 106a, the second volume 106b, and/or the third volume 106c by a roof 105c or back wall of the cabinet 104 to reduce the likelihood of exposing the controller 148 to one or more process fluids during installation, startup, regular operation, shutdown, maintenance, or repair that may compromise operation of the controller 148.

While the first volume 106a, the second volume 106b, and the third volume 106c have been described as having a negative pressure provided by the plurality of gas movers 146a, 146b, and 146c, the fourth volume 106d may be in fluid communication with a fan 154 operable to generate positive pressure in the fourth volume 106d, relative to an environment outside of the fourth volume 106d, to control temperature of the controller 148 and/or other components within the fourth volume 106d. Further, or instead, while the fourth volume 106d has been described as housing the controller 148, it shall be appreciated that the fourth volume 106d may house all controls and power electronics for the system 100, as may be useful for reducing the likelihood that inadvertent sparking or overheating of one or more of such components can ignite a hydrogen-containing mixture in one or more of the first volume 106a, the second volume 106b, or the third volume 106c.

In certain implementations, the controller 148 may further, or instead, monitor one or more ambient conditions in the first volume 106a, the second volume 106b, and the third volume 106c to facilitate taking one or more remedial actions before an anomalous condition results in damage to the system 100 and/or to an area near the system 100. In particular, given the potential damage that may be caused by the presence of an ignitable hydrogen-containing mixture within the cabinet 104, the system 100 may include a plurality of gas sensors 158a,b,c (referred to collectively as the plurality of gas sensors 158a,b,c and individually as the gas sensor 158a, the gas sensor 158b, and the gas sensor 158c). Each one of the plurality of gas sensors 158a,b,c may include any one or more of various different types of hydrogen sensors, such as one or more of optical fiber sensors, electrochemical hydrogen sensors, thin film sensors, and the like. To facilitate robust detection of hydrogen within the cabinet 104, the gas sensor 158a may be disposed in the first volume 106a, the gas sensor 158b may be disposed in the second volume 106b, and the gas sensor 158c may be disposed in the third volume 106c. Each one of the plurality of gas sensors 158a,b,c may be calibrated to detect hydrogen concentration levels below the ignition limit of hydrogen to facilitate taking remedial action before an ignition event can occur. Toward this end, the controller 148 may be in electrical communication with each one of the plurality of gas sensors 158a,b,c, and the non-transitory computer readable storage media of the controller 148 may have stored thereon instructions for causing one or more processors of the controller 148 to interrupt electrical communication between the power source 150 and equipment in the cabinet 104 based on a signal, received from one or more of the plurality of gas sensors 158a,b,c, and indicative of a dangerous hydrogen concentration. Additionally, or alternatively, the signal received from the one or more of the plurality of gas sensors 158a,b,c may be indicative of a rapid increase in hydrogen concentration.

While the controller 148 may be useful for taking remedial action with respect to potentially hazardous conditions in the cabinet 104, the system 100 may additionally, or alternatively, include one or more safety features useful for mitigating damage to the system 100 and/or in the vicinity of the system in the event of an explosion. For example, the system 100 may include a pressure relief valve 160 in fluid communication with at least the third volume 106c of the cabinet 104. The pressure relief valve 160 may be a mechanical valve that is self-opening at a predetermined threshold pressure in the third volume 106c. In some instances, the predetermined threshold pressure may be a pressure increase resulting from leakage of pressurized hydrogen into the third volume 106c. Alternatively, the predetermined threshold pressure may be a high pressure associated with a rapid pressure rise associated with combustion of a hydrogen-containing mixtures. In each case, the pressure relief valve 160 may vent contents of the third volume 106c to the environment to mitigate damage that may otherwise occur.

In general, the components within the cabinet 104 may be connectable to external resources from a location outside of the cabinet 104, such as along one or more outer surfaces of the cabinet 104. Without the need for personnel to open the cabinet 104, such connections may facilitate installation of the system 100. Further, or instead, for an otherwise comparable arrangement of components, connections made on the outside of the cabinet 104 may provide additional spacing between components in each of the first volume 106a, the second volume 106b, and the third volume 106c. This, in turn, may be useful for providing trained personnel with better access to components within the cabinet 104. Further, or instead, connecting components along one or more outer surfaces of the cabinet 104 may provide advantages with respect to safety. For example, electrical contacts 156 may be disposed on an outer surface of the cabinet 104 (e.g., along an outer surface of the cabinet 104 defining the fourth volume 106d), and the electrical contacts 156 may be in electrical communication with at least the electrochemical stack 200 via the controller 148. Continuing with this example, the electrical contacts 156 may be releasably engageable (e.g., via a contactor or fuse) in electrical communication with the power source 150 located on the outside of the cabinet 104. In the event that a disconnect function causes a spark, the spark is located outside of the cabinet 104 and generally away from potentially ignitable hydrogen-containing gas mixtures that may inadvertently form in the first volume 106a, the second volume 106b, and/or the third volume 106c.

Having described certain aspects of the overall layout of the system 100 useful for safely producing hydrogen within a small footprint, attention is now directed to specific features of the electrochemical module 102 itself that may facilitate separately managing water and gas in the electrochemical module 102 to provide additional, or alternative, safety during operation of the system 100 and/or to facilitate installation, maintenance, and/or repair of the system 100, thus reducing downtime associated with such events.

Figure 2A:
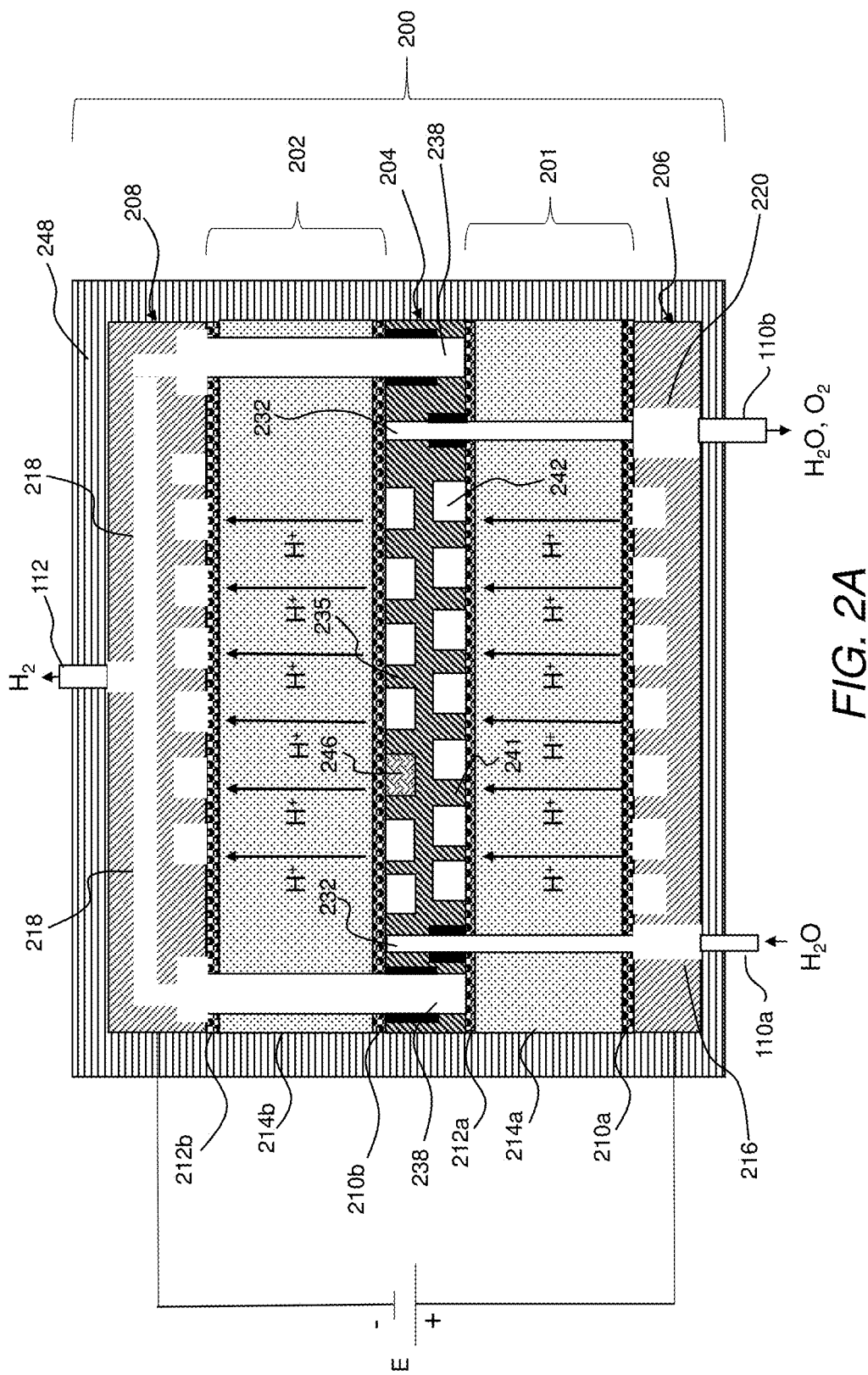
FIG. 2A is a schematic representation of an electrochemical stack of the electrochemical module of the system of FIGS. 1A and 1B.
Figure 2C:
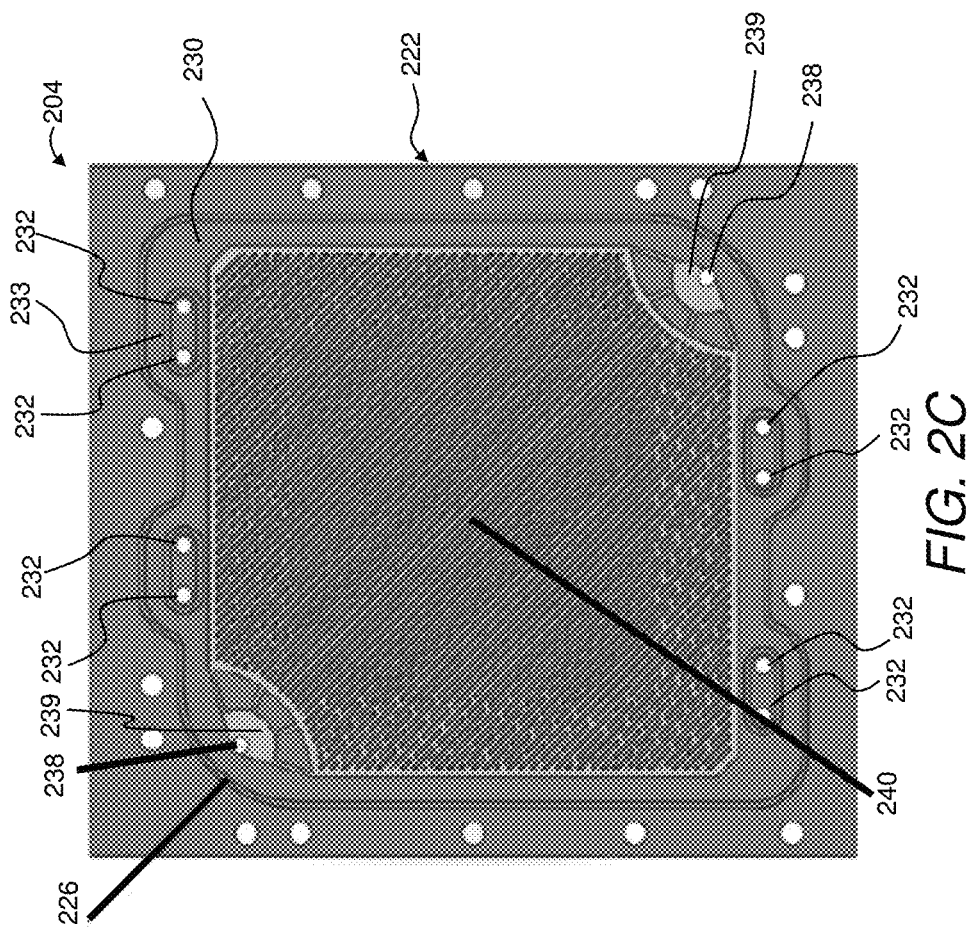
FIG. 2C is a top view of a cathode side of the bipolar plate of FIG. 2B.
Figure 2B:
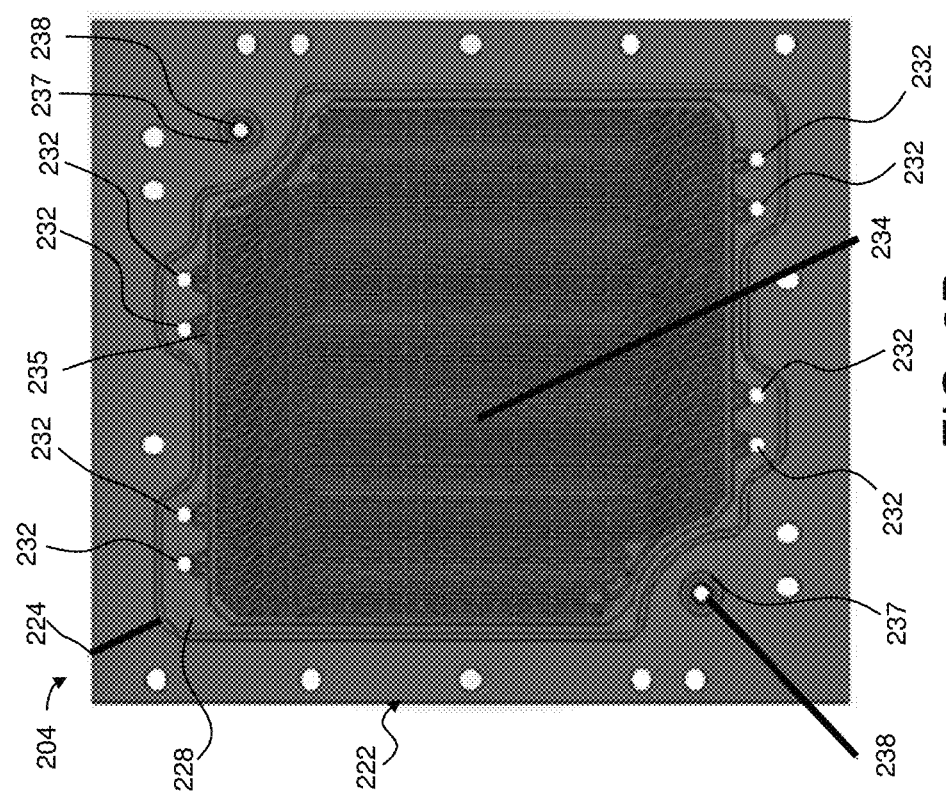
FIG. 2B is a top view of an anode side of a bipolar plate of the electrochemical stack of FIG. 2A.

Referring now to FIG. 2A-2C, the electrochemical stack 200 may include a first membrane electrode assembly (MEA) 201, a second membrane electrode assembly (MEA) 202, and a bipolar plate 204 that collectively define two complete electrochemical cells for the generation of hydrogen. The electrochemical stack 200 may also include a first end plate 206 and a second end plate 208 that may sandwich the first MEA 201, the second MEA 202, and the bipolar plate 204 into contact with one another and direct the flow of fluids into and out of the electrochemical stack 200. While the electrochemical stack 200 is described as including two complete cells—a single bipolar plate and two MEAs—it shall be appreciated that this is for the sake of clarity of explanation and illustration only. It shall be more generally understood that the electrochemical stack 200 may include any number of MEAs and bipolar plates useful for meeting the hydrogen generation demands of the system 100 shown in FIGS. 1A and 1B, while maintaining separation between pressurized hydrogen and lower pressure water and oxygen flowing through the electrochemical stack 200. That is, unless otherwise specified or made clear from the context, the electrochemical stack 200 may include more than one bipolar plate, a single MEA, and/or more than two MEAs. Further, or instead, while the electrochemical stack 200 is shown as including the first end plate 206 in contact with the first MEA 201 and the second end plate 208 in contact with the second MEA 202, it shall be appreciated that this is again for the sake of clear and efficient description. That is, in some instances, an instance of the bipolar plate 204 may be disposed between the first end plate 206 and the first MEA 201 and/or between the second end plate 208 and the second MEA 202, without departing from the scope of the present disclosure.

In general, the first MEA 201 and the second MEA 202 may be identical to one another. For example, the first MEA 201 may include an anode 210a, a cathode 212a, and a proton exchange membrane (e.g., a PEM electrolyte) 214a therebetween. Similarly, the second MEA 202 may include an anode 210b, a cathode 212b, and a proton exchange membrane 214b therebetween. The anodes 210a, 210b may each comprise an anode catalyst (i.e., electrode) contacting the membrane and an optional anode fluid diffusion layer. The cathodes 212a, 212b may each comprise a cathode catalyst (i.e., electrode) contacting the membrane and an optional cathode gas diffusion layer. The anode electrode may comprise any suitable anode catalyst, such as an iridium layer. The anode fluid diffusion layer 246 may comprise a porous material, mesh or weave, such as a porous titanium sheet or a porous carbon sheet. The cathode electrode may comprise any suitable cathode catalyst, such as a platinum layer. The cathode gas diffusion layer may comprise porous carbon. Other noble metal catalyst layers may also be used for the anode and/or cathode electrodes. The electrolyte may comprise any suitable proton exchange (e.g., hydrogen ion transport) polymer membrane, such as a Nafion® membrane composed of sulfonated tetrafluoroethylene based fluoropolymer-copolymer having a formula $C_7HF_{13}O_5S.C_2F_4$.

The bipolar plate 204 may be disposed between the cathode 212a of the first MEA 201 and the anode 210b of the second MEA 202. In general, the bipolar plate 204 may include a substrate 222, an anode gasket 224, and a cathode gasket 226. The substrate 222 has an anode (i.e., water) side 228 and a cathode (i.e., hydrogen) side 230 opposite one another. The anode gasket 224 may be fixed to the anode side 228 of the substrate 222, and the cathode gasket 226 may be fixed to the cathode side 230 of the substrate 222. Such fixed positioning of the anode gasket 224 and the cathode gasket 226 on opposite sides of the substrate 222 may facilitate forming two seals that are consistently placed relative to one another and relative to the first MEA 201 and the second MEA 202 on either side of the bipolar plate 204. The gaskets form a double seal around the active areas (i.e., anode (e.g., water) flow field 234 and cathode (e.g., hydrogen) flow field 240) located on respective opposite sides 228, 230 of the bipolar plate 204. Further, or instead, in instances in which an electrochemical stack includes an instance of an MEA between two instances of the bipolar plate 204, the anode gasket 224 and the cathode gasket 226 may form a double seal along an active area of the MEA. Thus, more generally, it shall be appreciated that the anode gasket 224 and the cathode gasket 226 may form a sealing engagement with one or more MEAs in an electrochemical stack to isolate flows within the electrode stack and, thus, reduce the likelihood that pressurized hydrogen may inadvertently mix with a flow of water and oxygen exiting the electrochemical stack to create an combustible hydrogen-oxygen mixture in the system 100 shown in FIGS. 1A and 1B.

The substrate 222 may be formed of any one or more of various different types of materials that are electrically conductive, thermally conductive, and have strength suitable for withstanding the high pressure of hydrogen flowing along the cathode side 230 of the substrate 222 during use. Thus, for example, the substrate 222 may be at least partially formed of one or more of plasticized graphite or carbon composite. Further, or instead, the substrate 222 may be advantageously formed of one or more materials suitable for withstanding prolonged exposure to water on the anode side 228 of the substrate 222. Accordingly, in some instances, the anode side 228 of the substrate 222 may include an oxidation inhibitor coating that is electrically conductive, examples of which include titanium, titanium oxide, titanium nitride, or a combination thereof. The oxidation inhibitor may generally extend at least along those portions of the anode side 228 of the substrate 222 exposed to water during operation of the electrochemical stack 200. That is, the oxidation inhibitor may extend at least along the anode flow field 234 inside the anode gasket 224 on the anode side 228 of the substrate 222. In some implementations, the oxide inhibitor may extend along the plurality of anode ports (i.e., water riser openings) 232 which extend from the anode side 228 to the cathode side 230 of the substrate 222. The oxidation inhibitor may also be located in the anode plenums 235 which connect the anode portions 232 to the anode flow field 234 on the anode side of the substrate 222.

A cathode ring seal 237 may be located around each cathode port (i.e., hydrogen riser opening) 238 on the anode side 228 of the substrate, as shown in FIG. 2B. The cathode ring seal 237 prevent hydrogen from leaking out into the anode flow field 234 on the anode side 228 of the substrate 222. In contrast, an anode ring seal 233 may be located around each one or more anode ports 232 on the cathode side 230 of the substrate 222. For example, as shown in FIG. 2C, two anode ports 232 are surrounded by a common anode ring seal 233 to prevent water from flowing into the cathode flow field 240 on the cathode side of the substrate 222.

The anode flow field 234 includes a plurality of straight and/or curved ribs 235 separated by flow channels 236 oriented to direct a liquid (e.g., purified water) between at least some of the plurality of anode ports 232, such as may be useful for evenly distributing purified water along the anode 210b of the second MEA 202 in the configuration shown in FIG. 2A. The anode gasket 224 may circumscribe the anode flow field 234 and the plurality of anode ports 232 along the anode side 228 of the substrate 222 to limit the movement of purified water moving along the anode 210b. That is, the anode side 228 of the substrate 222 may be in sealed engagement with the anode 210b of the second MEA 202, via the anode gasket 224, such that anode channels 236 are located therebetween. Under pressure provided by a source external to the electrochemical stack 200 (e.g., such as the pump 122 of the water circuit 114 shown in FIG. 1B), a liquid provided from the first fluid connector 110a flows along the anode channels 236 is directed across the anode 210b of the second MEA 202, from one instance of the plurality of anode ports 232 to another instance of the plurality of anode ports 232, where the liquid (e.g., remaining water and oxygen) may be directed out of the electrochemical stack 200 through another first fluid connector 110b Additionally the substrate 222 may include plurality of cathode ports (i.e., hydrogen riser openings) 238, each extending from the anode side 228 to the cathode side 230 of the substrate 222. The cathode side 230 of the substrate 222 may include cathode flow field 240. The cathode flow field 240 includes a plurality of straight and/or curved ribs 241 separated by cathode flow channels 242 oriented to direct gas (e.g., hydrogen) toward the plurality of cathode ports 238, such as may be useful for directing pressurized hydrogen formed along the cathode 212a of the first MEA 201 in the configuration shown in FIG. 2A. Cathode plenums 239 may be located between the respective cathode ports 238 and the cathode flow field 240. The cathode gasket 226 may circumscribe the cathode flow field 240, the cathode plenums 239 and the plurality of cathode ports 238 along the cathode side 230 of the substrate 222 to limit movement of the pressurized hydrogen along the cathode 212a. For example, the cathode side 230 of the substrate 222 may be in sealed engagement with the cathode 212a of the first MEA 201, via the cathode gasket 226, such that the cathode flow channels 242 are defined between the cathode 212a of the first MEA 201 and the cathode side 230 of the substrate 222. The pressure of the hydrogen formed along the cathode 212a may move the hydrogen along at least a portion of the cathode channels 242 and toward the cathode ports 238 located diagonally opposite to the cathode inlet port. The pressurized hydrogen may flow out of the cathode ports 238 and out of the electrochemical stack 200 through the second fluid connector 112 to be processed by the hydrogen circuit 116 as shown in FIG. 1B.

The anode gasket 224 on the anode side 228 of the substrate 222 and the cathode gasket 226 on the cathode side 230 of the substrate 222 may have different shapes (as shown in FIGS. 2B and 2C). For example, the anode gasket 224 may extend between the plurality of anode ports 232 and the plurality of cathode ports 238 on the anode side 228 of the substrate 222. In other words the anode gasket 224 surrounds the anode ports 232 and the anode flow field 234 on one lateral side, but leaves the cathode portions 238 outside its circumscribed area. In an installed position, therefore, the anode gasket 224 may fluidically isolate anode flow from cathode flow.

In contrast, the cathode gasket 226 on the cathode side 230 of the substrate 222 does not extend between the plurality of anode ports 232 and the plurality of cathode ports 238. In other words the cathode gasket 226 surrounds the anode ports 232, the cathode portions 238 and the cathode flow field 240. Instead, the anode ring seals 233 isolate the anode portions 232 from the cathode ports 238 and the cathode flow field 240 on the cathode side 230 of the substrate 222.

In one configuration the anode flow field 234 and the cathode flow field 240 may have the same shape, albeit on opposite side of the substrate 222 to provide the same active area along the first MEA 201 and the second MEA 202. Thus, taken together, it shall be appreciated that the differences in shape between the anode gasket 224 and the cathode gasket 226 along with positioning of the anode ring seals and the same shape of the anode flow field 234 and the cathode flow field 240 may result in different sealed areas. These different sealed areas are complementary to one another to facilitate fluidically isolating the lower pressure flow of purified water along the anode channels 236 from the pressurized hydrogen flowing along the cathode channels 242 while nevertheless allowing each flow to move through the electrochemical stack 200 and ultimately exit the electrochemical stack 200 along different channels.

In certain implementations, the cathode flow field 240 may be shaped such that a minimum bounding rectangle of the cathode flow field 240 is square. As used in this context, the term minimum bounding rectangle shall be understood to be a minimum rectangle defined by the maximum x- and y-dimensions of the cathode flow field 240. The plurality of cathode ports 238 may include two cathode ports per substrate 222 which are located in diagonally opposite corners from one another with respect to the minimum bounding rectangle (e.g., within the minimum bounding rectangle). The other two diagonally opposite corners lack the cathode ports 238. In instances in which the minimum bounding rectangle is square, the diagonal positioning of the cathode ports 238 relative to the minimum bounding rectangle may facilitate flow of pressurized hydrogen diagonally along the entire cathode flow field 240, while leaving a large margin of the substrate 222 material for strengths against the contained internal hydrogen pressure. Alternatively, the substrate 222 may be a rectangle. The plurality of cathode ports 238 are positioned away from edges of the substrate 222 such that each one of the plurality of cathode ports 238 is well-reinforced by the material of the substrate 222 between the respective one of the plurality of cathode ports 238 and the closest edge of the substrate 222.

Given the large pressure differential between the flow of pressurized hydrogen along the cathode channels 242 and the flow of water and oxygen along the anode channels 236, the electrochemical stack 200 may include the anode fluid diffusion layer disposed in the anode channels 236 and optionally between the anode electrode of the anode 210b of the second MEA 202 and the anode side 228 (e.g., anode ribs 235) of the substrate 222. The porous material of the anode fluid diffusion layer 246 may generally permit the flow of water and oxygen through the anode channels 236 without a substantial increase in flow restriction through the anode channels 236 while providing structural support on the anode side 228 of the substrate 222 to resist collapse that may result from the pressure difference on opposite sides of the substrate 222. For the sake of clear illustration, the porous material 246 is shown along only one anode channel 236. It shall be understood, however, the that porous material 246 may be disposed inside all of the anode channels 236 in certain implementations.

As an additional, or alternative, safety measure, the electrochemical stack 200 may include a housing 248 disposed about the first MEA 201, the second MEA 202, the bipolar plate 204, the first end plate 206, and the second end plate 208, as shown in FIG. 2A. More specifically, the housing 248 may be formed of one or more materials useful for absorbing force of one or more materials that may become ejected in the event of a failure event (e.g., failure under the force of pressurized hydrogen and/or failure resulting from explosion of an inadvertent hydrogen-containing mixture). As an example, the housing 248 may include one or more of metal or aramid (e.g., Kevlar®) fibers.

Having described various features of the electrochemical stack 200, attention is now directed to a description of operation of the electrochemical stack 200 to form pressurized hydrogen with water and electricity as inputs. In particular, as shown in FIG. 2A, an electric field E (i.e., voltage) may be applied across the electrochemical stack 200 (i.e., between the end plates 206 and 208) from the power source 150 shown in FIG. 1B. The bipolar plate 204 may electrically connect the first MEA 201 and the second MEA 202 in series with one another such that electrolysis may take place at the first MEA 201 and the second MEA 202 to form a flow of pressurized hydrogen that is maintained fluidically isolated from lower pressure water and oxygen, except for proton exchange occurring through the proton exchange membrane 214a and the proton exchange membrane 214b.

Purified water (e.g., from the water circuit 114 shown in FIG. 1B) may be introduced into the electrochemical stack 200 via the first fluid connector 110a of the electrochemical module 102 as shown in FIG. 1B. Within the electrochemical stack 200, the purified water may flow along an intake channel 216 that extends through the bipolar plate 204, among other components, to direct the purified water to the anode 210a of the first MEA 201 and to the anode 210b of the second MEA 202. With the electric field E applied across the anode 210a and the cathode 212a of the first MEA 201, the purified water may break down along the anode 210a into protons ($H^+$) and oxygen. The protons ($H^+$) may move from the anode 210a to the cathode 212a through the proton exchange membrane 214a. At the cathode 212a, the protons ($H^+$) may combine with one another to form pressurized hydrogen along the cathode 212a. Through an analogous process, pressurized hydrogen may also be formed along the cathode 212b of the second MEA 202. The flows of pressurized hydrogen formed by each of the first MEA 201 and the second MEA 202 may combine with one another and flow out of the electrochemical stack 200 via two hydrogen exhaust channels 218 that extends through the bipolar plate 204, among other components, to ultimately direct the pressurized hydrogen out of the second fluid connector 112 of the electrochemical module 102 and toward the hydrogen circuit 116 for processing (as shown in FIG. 1B and discussed above). The flows of oxygen and water along the anode 210a and the anode 210b may combine with one another and flow out of the electrochemical stack 200 via the outlet anode ports 232 and an outlet channel 220 that extends through the end plate 206, among other components, to direct this stream of water and oxygen out of the first fluid connector 110b of the electrochemical module 102 and toward the water circuit 114 for processing (as shown in FIG. 1B and discussed above).

As discussed above, the bipolar plate 204 may be in sealed engagement with the cathode 212a of the first MEA 201 and the anode 210b of the second MEA to facilitate keeping pressurized hydrogen formed along the cathode 212a of the first MEA 201 separate from water and oxygen flowing along the anode 210b of the second MEA 202. This separation is useful for reducing the likelihood of leakage of pressurized hydrogen from the electrochemical stack 200 and, thus, may be useful in addition to, or instead of, any one or more aspects of the modularity of the system 100 (shown in FIGS. 1A and 1B) with respect to safely producing industrial-scale quantities of hydrogen through electrolysis. Additionally, or alternatively, as described in greater detail below with respect to FIGS. 3A and 3B, the sealed engagement facilitated by the bipolar plate 204 may facilitate dismantling the electrochemical module 102 (e.g., to repair, maintain, and/or replace the electrochemical stack 200) with a lower likelihood of spilling water in the vicinity of the cabinet 104 shown in FIG. 1A.

Figure 3B:
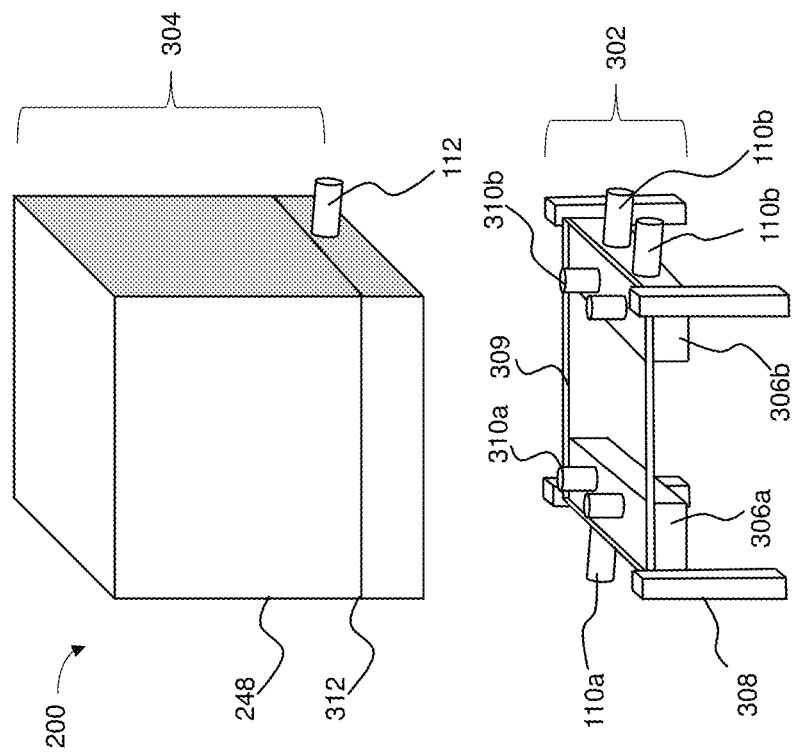
FIG. 3B is a partial exploded view of the electrochemical module of the system of FIGS. 1A and 1B, shown with the liquid-management section and the gas-management section of the electrochemical module decoupled from one another.
Figure 3A:
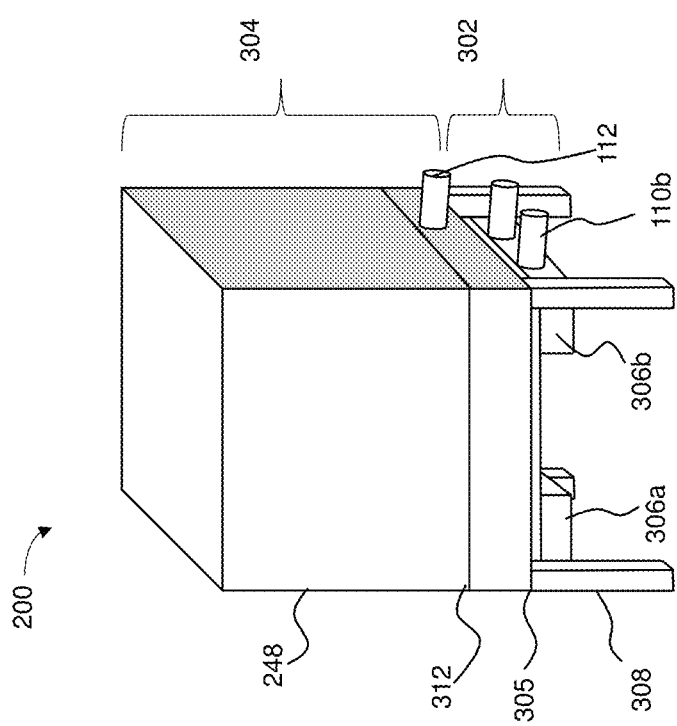
FIG. 3A is a perspective view of the electrochemical module of the system of FIGS. 1A and 1B, shown with a liquid-management section and a gas-management section of the electrochemical module shown coupled to one another.

Referring now to FIGS. 3A and 3B, the electrochemical module 102 may include a liquid-management section 302 and a gas-management section 304 that are releasably securable to one another (e.g., using clamps, bolts, or a combination thereof) along an interface 305 to facilitate installation, maintenance, and/or repair. For example, the gas-management section 304 may be removable from the liquid-management section 302 without the need to break water connections at the first fluid connectors 110a,b. As compared to installations requiring removal of water connections, the ability to remove the gas-management section 304 from the liquid-management section 302 may reduce the time required performing a mechanical operation related to installation, maintenance, and/or repair. Further, or instead, because water connections may remain intact, inadvertent dispersion of water around the cabinet 104 shown in FIG. 1A is less likely.

In general, the liquid-management section 302 may include the plurality of first fluid connectors 110a,b fluidly connected to respective inlet and outlet water manifolds 306a,b. Each one of the plurality of first fluid connectors 110a,b may be in fluid communication with the respective manifold 306a,b. In turn, the manifolds 306a,b may include respective liquid connections 310a, 310b (e.g., O-rings and/or tubes) securable to the gas-management section 304, to deliver purified water to the gas-management section 304 via the first fluid connector 110a and the liquid connection 310a and to receive an anode-out flow of water and oxygen via the first fluid connector 110b and the liquid connection 310b. The manifolds 306a,b may comprise hollow plastic or metal boxes. The liquid-management section 302 may include a support, such as legs 308 or a pedestal-type support.

An optional separator plate 309, such as a stainless steel plate, may be located on the top of the liquid-management section 302, such that the respective liquid connections 310a, 310b extend through the separator plate. For example, the respective liquid connections 310a, 310b may comprise holes in the separator plate 309 surrounded by respective O-rings.

Referring now to FIG. 2A and FIGS. 3A and 3B, the gas-management section 304 of the electrochemical module 102 may include the electrochemical stack 200, a collector plate 312 and the second fluid connector 112. Thus, stated differently, the liquid-management section 302 and the gas-management section 304 may be separable from one another along low-pressure water connections 110a,b while high-pressure connections 112 associated with the flow of pressurized hydrogen out of the electrochemical module 102 need not be disturbed and, thus, failure modes associated with repeatedly breaking and reestablishing high-pressure connections are not present in the electrochemical module 102. The collector plate 312 may be oriented perpendicular to the direction of the connectors 110a,b and 112 (e.g., out of the page in FIG. 3A).

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A system for hydrogen generation, comprising:
at least one cabinet defining a first volume, a second volume, and a third volume, wherein the first volume, the second volume and the third volume are fluidically isolated from each other;
a water circuit located in the first volume;
an electrochemical module comprising an electrolyzer electrochemical stack located in the second volume;
a hydrogen circuit located in the third volume;
at least one first fluid connector fluidly connecting the water circuit and the electrolyzer electrochemical stack; and
at least one second fluid connector fluidly connecting the electrolyzer electrochemical stack and the hydrogen circuit.

2. The system of claim 1, wherein:
the at least one cabinet comprises a single cabinet in which the first volume is isolated from the second volume by a first internal wall, and the second volume is isolated from the third volume by a second internal wall;
the at least one first fluid connector extends through the first internal wall; and
the at least one second fluid connector extends through the second internal wall.

3. The system of claim 1, further comprising:
a first gas mover fluidly connected to the first volume but not the second or the third volumes, and configured to ventilate the first volume without ventilating the second or the third volumes;
a second gas mover fluidly connected to the second volume but not the first or the third volumes, and configured to ventilate the second volume without ventilating the first or the third volumes; and
a third gas mover fluidly connected to the third volume but not the first or the second volumes, and configured to ventilate the third volume without ventilating the first or the second volumes.

4. The system of claim 3, wherein the first, second and third gas movers are operable to form a negative pressure in each of the first volume, the second volume, and the third volume relative to an environment outside of the single cabinet.

5. The system of claim 1, wherein:
the electrolyzer electrochemical stack comprises at least one bipolar plate and a plurality of membrane electrode assemblies (MEAs);
the plurality of MEAs and the at least one bipolar plate define at least one anode channel and at least one cathode channel separated from one another by the at least one bipolar plate;
the at least one anode channel is in fluid communication with the water circuit via the at least one first fluid connector;
the at least one cathode channel is in fluid communication with the hydrogen circuit via the second fluid connector;
the MEA includes an anode, a cathode, and a proton exchange membrane therebetween; and
the second volume is located between the first volume and the third volume.

6. The system of claim 5, wherein:
the water circuit includes a pump, a reservoir, and a separator;
the at least one first fluid connector comprises two fluid connectors;
the reservoir is in fluid communication between the separator and the pump;
the pump is in fluid communication with the anode channel of the electrochemical stack via one of the two first fluid connectors; and
the separator is in fluid communication with the at least one anode channel of the electrochemical stack via a second one of the two first fluid connectors.

7. The system of claim 5, wherein the hydrogen circuit comprises:
a dryer having an inlet portion in fluid communication with the at least one cathode channel of the electrolyzer electrochemical stack via the second fluid connector; and
a hydrogen pump in fluid communication with outlet and inlet portions of the dryer, wherein the hydrogen pump is operable to recirculate pressurized hydrogen from the outlet portion of the dryer to the inlet portion of the dryer.

8. The system of claim 4, further comprising:
a controller in electrical communication with the electrochemical stack and located in a fourth volume of the cabinet which is fluidically isolated from each of the first volume, the second volume, and the third volume; and electrical contacts disposed on an outer surface of the at least one cabinet, wherein:

the electrical contacts are releasably engageable in electrical communication with a power source; and the electrical contacts are in electrical communication with the electrochemical stack via the controller.

9. The system of claim 8, further comprising a fan in fluid communication with the fourth volume, wherein the fan is operable to form positive pressure in the fourth volume relative to an environment outside of the cabinet.

10. The system of claim 8, further comprising a plurality of gas sensors, wherein:

each of the plurality of gas sensors is configured to measure a hydrogen-containing gas;

each gas sensor is disposed in one of the first volume, the second volume, and the third volume;

each gas sensor is in electrical communication with the controller; and the controller is configured to interrupt electrical communication between the power source and equipment in the cabinet based on a signal received from one or more of the plurality of gas sensors.

\* \* \* \* \*